Sept. 1, 1964    F. ARNOLD    3,147,002

MECHANICAL-HYDRAULIC FASTENING DEVICE

Filed Nov. 22, 1961    2 Sheets-Sheet 1

INVENTOR.
FRANZ ARNOLD
BY
Woodhams, Blanchard & Flynn
ATTORNEYS

Sept. 1, 1964 F. ARNOLD 3,147,002
MECHANICAL-HYDRAULIC FASTENING DEVICE
Filed Nov. 22, 1961 2 Sheets-Sheet 2

INVENTOR.
FRANZ ARNOLD
BY
Woodhams Blanchard & Flynn
ATTORNEYS

United States Patent Office 3,147,002
Patented Sept. 1, 1964

3,147,002
MECHANICAL-HYDRAULIC FASTENING DEVICE
Franz Arnold, Schwangauerstr. 1, Hohenschwangau,
Füssen, Germany
Filed Nov. 22, 1961, Ser. No. 154,217
Claims priority, application Germany Nov. 23, 1960
8 Claims. (Cl. 269—24)

This invention relates to a mechanical-hydraulic fastening device for the fixing of work pieces, tools and the like, in which a fastening block is fed to the work piece by the rotation of a tightening spindle and then the displacement of a primary piston in a pressure space generates a hydraulic pressure which produces the fixing pressure of the block via a secondary piston.

In a known fastening device of this type, in the form of a vice, the whole hydraulic mechanism, viz. pressure space and primary and secondary pistons, is arranged in the interior of the vice or at the inner end of the tightening spindle. This requires a complicated and expensive special construction. The object of the invention is to provide a mechanical-hydraulic fastening device of simple construction which permits the incorporation of the hydraulic mechanism in the fastening device or vice of normal construction without appreciable alteration thereof.

In accordance with the invention the pressure space together with the primary and secondary pistons are arranged in the end of the tightening spindle which is of enlarged diameter and within this end of the spindle there is arranged a bolt which is rotatable by means of a hand crank or the like and which can screw in an internal screw thread at the end of the spindle and the end of which bears on the primary piston.

This new construction provides, compared with the known construction, an appreciable simplification since the whole of the hydraulic mechanism is arranged solely in the spindle, at the outer end thereof. This has the advantage that the normal mechanical fastening device can be changed to a mechanical-hydraulic fastening device without appreciable alteration, viz. solely by exchanging the tightening spindle.

Figure 1:
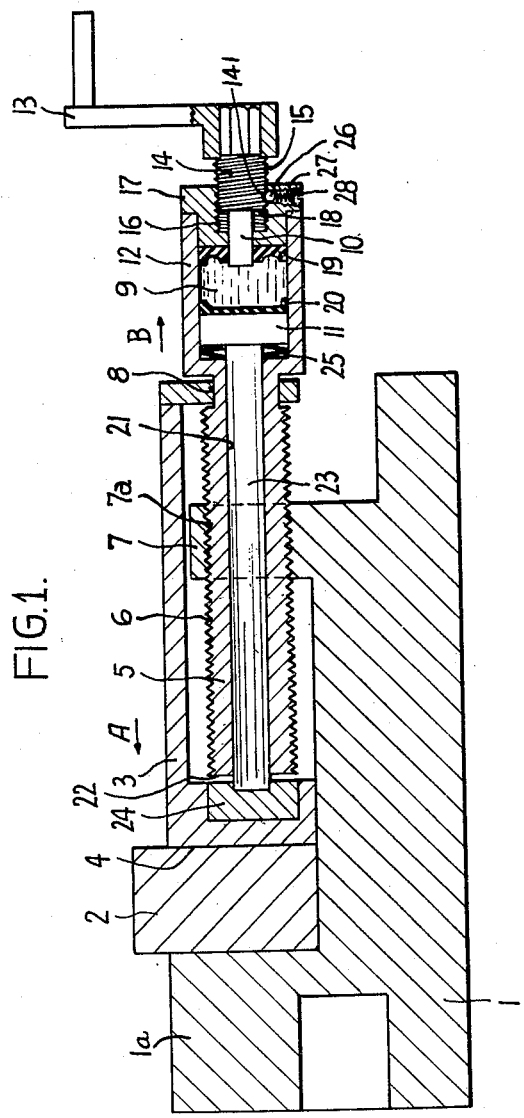
Figure 2:
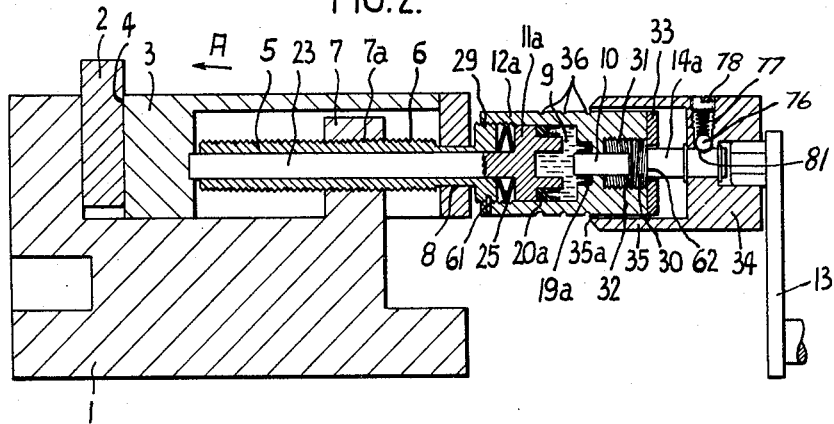
Figure 3:
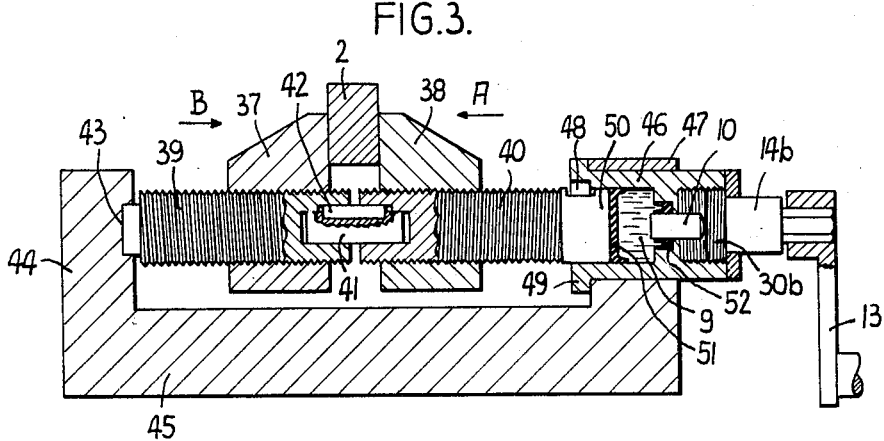

Further details of the invention and the advantages thereof will now be described with reference to the embodiments of the invention shown by way of example in the accompanying drawings, in which FIG. 1 is a vertical longitudinal section through a mechanical-hydraulic vice, FIG. 2 is a similar view of an improved form of vice shown in FIG. 1 and FIG. 3 is a similar view of a centrally fixing vice according to the invention.

In FIGS. 1 and 2 reference numeral 1 indicates the baseplate of a vice, having a fixed jaw 1a thereon, the work piece to be fixed is shown at 2 and 3 indicates a slide which has a tightening block or movable jaw 4 thereon. Reference numeral 5 indicates a tightening spindle which has an external screw thread 6 by means of which it is rotatably mounted in a carrier or support means formed by a projection 7 on the baseplate 1. The spindle 5 has a neck 8 by means of which it is journalled with slight axial play in the slide 3. As can be seen from FIG. 1, a pressure space 9 filled with liquid is arranged, together with a primary piston 10 and a secondary piston 11, in the outer end 12 of the spindle 5, this end being of enlarged diameter. Within this end 12 of the spindle is provided a bolt 14 which can be rotated by means of a hand crank 13 or the like, the bolt 14 having an external screw thread 15 and being capable of screwing in the internal screw thread 16 of the cover 17 which is secured to and closes the end 12 of the spindle, one end 18 of the bolt abutting the primary piston 10. Suitable seals 19 and 20 are provided for sealing off the two pistons 10 and 11.

As can also be seen from FIGS. 1 and 2, the widened end 12 or 12a of the spindle is arranged outside the slide 3. The spindle 5 has a longitudinal bore 21 in which the cylindrical piston rod 23 of the secondary piston 11 or 11a is disposed so as to be movable longitudinally, the piston rod 23 projecting beyond the inner end 22 of the spindle 5. This piston rod 23 bears against a lining member 24 arranged in the slide 3.

In the widened end 12 or 12a of the spindle there is provided a resilient member, e.g. spring plates 25 which act in the axial direction on the secondary piston 11 or 11a in such manner that there is produced in the pressure space 9 a pressure which acts continuously on the primary piston 10 and presses it against the end 18 of the rotary bolt 14 or 14a The operation of the vice shown in FIG. 1 is as follows.

Rotation of the hand crank 13 first rotates the spindle 12, 5 and thereby moves the slide 3 in the direction A until the block 4 bears on the work piece 2. Further rotation of the spindle 5 is then prevented by jamming in the screw thread 7a, so as to disengage an automatic torque release coupling between the screw threaded bolt 14 and the end 12, 17 of the spindle 5, the said coupling consisting for example of a ball 26, a compression spring 27 and an adjusting screw 28, forming a detent mechanism. The ball 26 is resiliently urged by the spring 27 into a depression 141 in the screw 14 whereby relative rotation of the screw 14 and the cover 17 is resiliently opposed. After the disengagement of this coupling, further rotation of the crank 13 causes the bolt 14 to screw into the internal screw thread 16 so that the primary piston 10 is shifted into the pressure space 9. The increasing pressure of the liquid in space 9 presses the secondary piston 11 together with the piston rod 23 in the direction A against the lining member 24 so that the work piece 2 is thereby firmly held by hydraulic pressure. Upon rotation of the crank 13 in the opposite direction, first of all the bolt 14 is caused to screw in the internal screw thread 16 so that the primary piston 10 is shifted in the direction B. As soon as the pressure in the space 9 has correspondingly diminished, the coupling 26–28 again engages to drivingly connect the bolt 14 to spindle 12, 5 so that upon further rotation of the crank 13 the spindle 12, 5 takes part in the rotation and the block 4 is thereby withdrawn from the work piece 2.

In the embodiment shown in FIG. 2 the end 12a of the spindle forms a separate part which is firmly screwed to the spindle 5 at 29. The rotary bolt 14a has a screw threaded head 30 which can screw in the internal screw thread 31 in the end 12a of the spindle and the end 32 of which bears on the primary piston 10 and in the end position shown abuts via a flange 62 against a cover 33 which closes the end of the spindle. Moreover, between the driving member, e.g., the hand crank 13, and the bolt 14a there is provided an automatic torque release coupling which is preferably adjustable and the arrangement of which is such that upon the attainment of a driving torque which corresponds to a predetermined maximum hydraulic pressure in the pressure space 9 this coupling disengages whereby the connection between the driving member and the bolt 14a is released. In this way it is arranged that the work piece 2 is ensured against being overloaded. The inclusion of this adjustable coupling therefore enables a fixing pressure to be exerted which is suited to the strength of the work piece. In the particularly advantageous construction shown in FIG. 2 this coupling, which for example may comprise a ball 76, compression spring 77 and adjusting screw 78 forming a detent device, is arranged in a casing 34 rotatably mounted on the bolt 14a, this casing being rotatable by means of a hand crank 13 or the like.

The ball 76 is resiliently urged by the spring 77 into a partially spherical recess 81 in the bolt 14a to resiliently oppose relative rotation between the casing 34 and said bolt. The pressure exerted by spring 77 on ball 76 can be adjusted by threading the screw 78 into or out of the casing. In this fashion the torque required to effect disengagement of the coupling can be adjusted. If in any case there is no room for the hand crank 13 then if desired the casing 34 which is of larger diameter can also be rotated by hand. As can also be seen from FIG. 2 the part 35 of the casing 34 surrounds the end 12a of the spindle, and on this end of the spindle there is arranged a pressure scale consisting for example of grooves 36.

In the construction shown by way of example in FIG. 2 the widened end 12a of the tightening spindle is a separate part. In this case it is advantageous for this widened end 12a to be adjustable on the spindle 5 by means of the screw thread 29 in such manner that upon loss of oil from the space 9 this latter can be reduced so that the necessary pressure can again be produced in the space 9. To enable the end 12a of the spindle to be set in various positions the part 12a has a screw threaded pin 61 which can engage in a plurality of corresponding holes in the spindle 5.

The operation of this device is as follows.

Upon rotation of the casing 34 by means of the crank 13 of the bolt 14a is rotated. Since the primary piston 10 is pressed against the screw threaded head 30 by the pressure produced in the space 9 with the spring plates 25, this screw threaded head 30 cannot screw in the screw thread 31 but takes with it the end 12a of the spindle, so that the tightening spindle 5 is moved in the direction A and the piston rod 23 feeds the slide 3 to the work piece 2 and applies it to the work piece. The jamming pressure produced in the screw thread 7a holds the spindle 5 stationary, so that upon further rotation of the crank 13 the screw threaded head 30 of the bolt 14a screws within the internal screw thread 31 in the direction A and the primary piston 10 is pressed into the space 9. The hydraulic pressure thereby produced presses the secondary piston 11a with its piston rod 23 against the slide 3 and in this way the work piece is hydraulically fastened. As soon as a predetermined fixing pressure, or corresponding pressure in the space 9, is reached, the coupling 76–78 disengages since the torque for which it is adjusted has been exceeded. The bolt 14a therefore remains stationary when the casing 34 is further rotated by the crank 13. The maximum fixing pressure which can be set by the coupling 76–78 can be read off from the scale 36 at the forward edge 35a of the sleeve 35. The pressure scale 36 can be of sufficiently large dimensions since the displacement of the sleeve 35 relatively to the end 12a of the spindle is dependent not only on the compressibility of the medium at 9 but also on the stretching of the spindle 5, 12a which is subjected to tension between the screw threaded support 7 and the pressure space 9. Also relevant is the elastic deformation of the long piston rod 23 which conveys the whole of the tightening pressure through the spindle 5.

In FIG. 3 is shown a centrally fixing vice according to the invention, in which the outer end of one part of the spindle is formed as a secondary piston. The work piece 2 is fastened centrally by jaws 37, 38 which are moved simultaneously in the directions B and A respectively through the intermediary of two tightening spindles 39 and 40 which are provided with screw threads of opposite hand and are connected together by a centering bolt 41. A spring 42 transmits the rotary movement of the spindle 40 to the spindle 39, some relative longitudinal movement of the spindles being possible. The spindle 39 bears at 43 on a cheek 44 of the baseplate 45, whilst the widened end 46 of the spindle 40 is journalled in a cheek 47 of the baseplate. The end 46 is formed as a separate sleeve which is movable longitudially to some extent on the spindle 40 but is prevented from rotation by a spring 48, the sleeve bearing via a flange 49 on the cheek 47. As shown in FIG. 3, the spindle 40 has a secondary piston 50 connected thereto or integral therewith. In this case also seals 51 and 52 are provided for the secondary piston 50 and the primary piston 10. As in the embodiment of FIG. 2, in this case also a rotary bolt 14b is provided with a screw threaded head 30b. In FIG. 3 the crank 13 is directly connected to the bolt 14b. However, in the arrangement shown in FIG. 3 a coupling can be included between the driving member 13 and the bolt 14b in the same way as in the embodiment shown in FIG. 2. Moreover, in FIG. 3 spring plates 25 may be provided for loading the secondary piston 50 and thereby producing a predetermined continuous pressure in the space 9.

What I claim is:

1. A mechanical-hydraulic gripping apparatus, comprising:
   a fixed jaw and a movable jaw;
   support means fixed with respect to said fixed jaw on the opposite side of said movable jaw from said fixed jaw and having a threaded opening therethrough;
   a threaded spindle having an axial opening therethrough and threaded through said threaded opening for movement toward and away from said fixed jaw on rotation of said spindle, said spindle having an enlarged end portion on the opposite side of said support means from said movable jaw, said end portion having a chamber therein;
   means secured to and extending away from said movable jaw and overlying said spindle to provide a cover therefor, said last-named means having a limited lost motion connection to said spindle adjacent said end portion whereby rotation of said spindle effects movement of said movable jaw toward and away from said fixed jaw;
   a piston rod extending axially slidably through the opening in said spindle and being directly engageable with said movable jaw for urging same toward said fixed jaw, said piston rod extending into said chamber;
   a secondary piston slidably mounted in said chamber and connected to said piston rod;
   a primary piston slidably mounted in said chamber and spaced from said secondary piston;
   a liquid filling in the space between said pistons and means for moving said primary piston toward and away from said secondary piston whereby hydraulic pressure can be applied to said secondary piston to urge said piston rod and thereby said movable jaw toward said fixed jaw under hydraulic pressure.

2. A mechanical-hydraulic gripping apparatus, comprising:
   a fixed jaw and a movable jaw and means supporting said fixed and movable jaws in confronting relation to each other so that work can be gripped therebetween;
   a spindle having an axial opening therethrough connected to said movable jaw for effecting movement thereof toward and away from said fixed jaw, said spindle having an end portion of larger size at the end thereof remote from said movable jaw, said end portion having a chamber therein;
   a primary piston and a secondary piston slidably disposed in said chamber in spaced apart relationship with a pressure liquid in the space between said pistons;
   means for moving said primary piston toward and away from said secondary piston whereby hydraulic pressure is applied to said secondary piston; and
   a piston rod connected to said secondary piston and slidably extending through the opening in said spindle and engageable with said movable jaw whereby the force urging said movable jaw toward said fixed jaw is responsive to the pressure applied to said secondary piston.

3. A mechanical-hydraulic gripping apparatus according to claim 2, in which said means for moving said primary piston includes a casing adjacent said end portion of said spindle, a hand crank connected to said casing for effecting rotation thereof; and a bolt connected to said casing and having a threaded portion threadedly engaging a threaded part of said spindle, said bolt also engaging said primary piston for effecting axial movement thereof in said chamber when said bolt rotates with respect to said spindle.

4. A mechanical-hydraulic gripping apparatus according to claim 3, in which the threaded part of said spindle is provided by an internally threaded recess in said end portion of said spindle, a cover closing off the outer end of said recess, said bolt extending through an opening in said cover, said threaded portion of said bolt consisting of an externally threaded portion threaded into said recess and being of larger diameter than said opening.

5. A mechanical-hydraulic gripping apparatus according to claim 3, in which said end portion of said spindle has a pressure scale thereon and said casing has means cooperable with said scale for indicating the gripping pressure between the jaws.

6. A mechanical-hydraulic gripping apparatus according to claim 3, in which said casing is connected to said bolt by an adjustable torque release coupling.

7. A mechanical-hydraulic gripping apparatus according to claim 2, in which an elastic member engages said secondary piston and continuously urges it toward said primary piston so that there is a continuous pressure on the liquid between said pistons.

8. A mechanical-hydraulic gripping apparatus according to claim 7, in which the end portion of the spindle consists of a plurality of parts which are axially movable with respect to each other to adjust the axial length of said chamber whereby loss of liquid from said chamber can be compensated for.

References Cited in the file of this patent
UNITED STATES PATENTS

| | | |
|---|---|---|
| 1,111,990 | Braun | Sept. 29, 1914 |
| 2,492,338 | Vickers | Dec. 27, 1949 |